(No Model.)
A. C. MATHER.
ELECTRICAL SWITCH BOARD.
No. 323,182. Patented July 28, 1885.
BEST AVAILABLE COPY
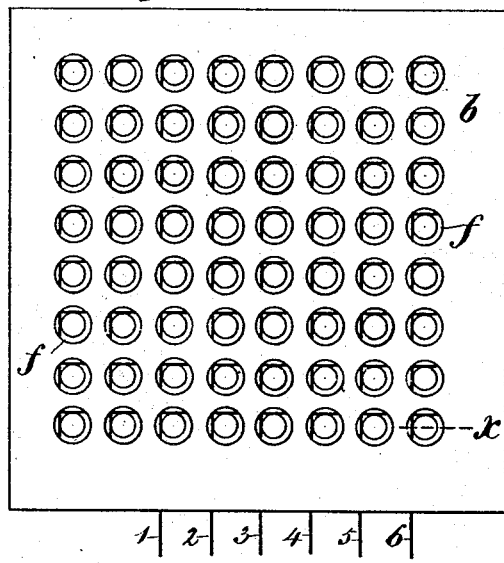
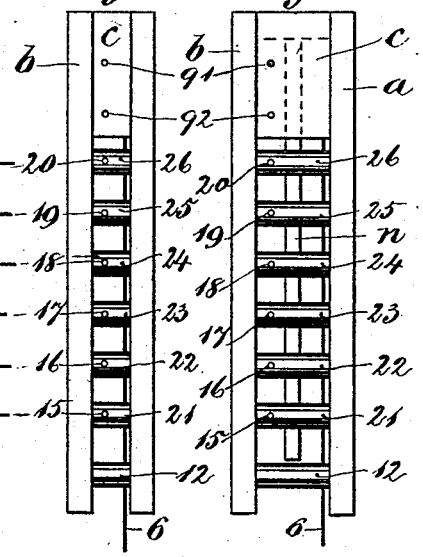
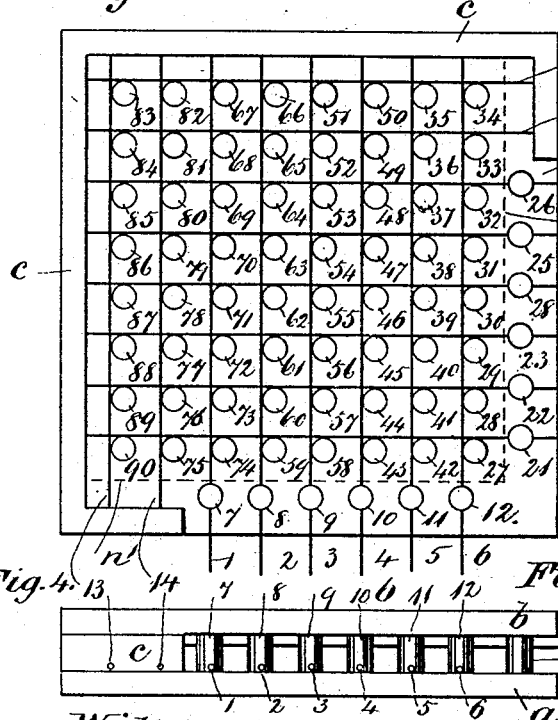
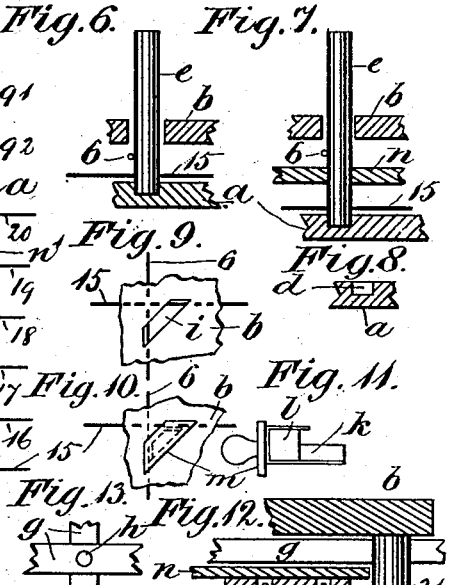
Witnesses.
J. Millard
Jos Marien
Inventor
A. C. Mather
By his Attorney
Charles G. Simpson

UNITED STATES PATENT OFFICE.

ALEXANDER CRAIG MATHER, OF MONTREAL, QUEBEC, CANADA.

ELECTRICAL SWITCH-BOARD.

SPECIFICATION forming part of Letters Patent No. 323,182, dated July 28, 1885.

Application filed January 22, 1885. (No model.)

*To all whom it may concern:*

Be it known that I, ALEXANDER CRAIG MATHER, of the city of Montreal, in the District of Montreal, Province of Quebec, Canada, have invented new and useful Improvements in Apparatus for Switching Currents of Electricity, &c.; and I do hereby declare that the following is a full, clear, and exact description of the same.

This invention has reference to the construction and arrangement of an apparatus by which, where a number of electric generators are employed upon a number of circuits, the electricity produced by any or all of the generators may be readily connected with all or any of the circuits—that is to say, all of the circuits may be connected with any one or more than one of the generators, either in series or in multiple arc; or, if the number of generators is equal to the number of circuits, a generator may be separately connected with each circuit, if desired.

In the drawings hereunto annexed similar letters of reference and numerals indicate like parts; and Figure 1 is a front elevation of an apparatus embodying my invention. Fig. 2 is a corresponding elevation to that shown in Fig. 1, but with cover $b$ removed. Fig. 3 is an end elevation of the invention. Fig. 4 is a plan of the bottom edge of the invention. Fig. 5 is an end elevation of a modification of my invention. Figs. 6, 7, 8, 9, 10, 11, 12, 13, and 14 are details of construction and modifications of such details.

Letter $a$ is a back plate. $b$ is a cover. $c$ is a distance-piece, by which the plate and cover are secured at the required distance apart. These are all formed of insulating material, and the cover forms a protection to the operator.

As illustrated in the drawings, the apparatus delineated is arranged for connecting three electrical generators having positive and negative connections with three circuits having similar connections; or, in the case of the telephone and others in which a single wire is used, the apparatus as shown is arranged for six generators and six single circuit-wires; but I wish it to be clearly understood that any number of generators may on the principle of this invention be connected with any number of circuits.

We will suppose 1, 2, 3, 4, 5, and 6 to be wires, and in the case of circuits requiring a positive and negative connection, the wire 1 is a negative and wire 2 a positive connection leading from any desired or suitable electric generator suitably situated. Similarly wire 3 is a negative and wire 4 a positive connection with a second electrical generator, and wire 5 is a negative and 6 a positive connection of a third electrical generator. These wires connect with any suitable binding-posts, 8, 9, 10, 11, and 12. The wires may either be continuous, passing through the said posts, or they may be separately connected with the posts, as desired. Wires 13 and 14 are auxiliary wires attached to the distance-piece $c$. These will hereinafter be more particularly described. Wire 15 is a negative and 16 a positive connection of any desired electrical circuit. Wire 17 is a negative and 18 a positive connection of a second electrical circuit, and wire 19 is a negative and 20 a positive connection of a third electrical circuit. These, similar to the wires Nos. 1 to 6, connect or pass through binding-posts 21, 22, 23, 24, 25, and 26. All the wires above mentioned extend across the apparatus, as shown in Fig. 2.

As shown by Figs. 3, 4, and 6, the wires 1 to 6 are near the plate $a$, while the wires 15 to 20 are near to the cover $b$, so that the connections of the electrical generators are situated in a plane at a distance from the plane in which the circuit-connections are situated. This distance will be made what is required considering the strength of the electric current to be employed, so that one current will not influence the other. In Fig. 2 the distance between the generator and circuit wires does not show; but it does show how all the generator-connections cross all the circuit-connections, so that by a pin, $e$, placed in recesses $d$, (see Fig. 8,) formed in the plate $a$, and situated upon the plate $a$ in such position that two wires, as shown, will be tangential to the pin $e$. A pin or pins, $e$, are thus enabled to form a connection or connections between two wires or a number of two wires. The holes $d$ (shown in Fig. 8) are in Fig. 2 indicated by numbers 27 to 90, inclusive, they being, as shown, sixty-four of the holes *d*.

91 and 92 are auxiliary wires, similar to 13 and 14, and the use of all of these wires will be hereinafter fully described. I would, however, here remark that the wires 13 and 14 are on the same plane as wires 1 to 6, while the wires 91 and 92 are in the same plane with the wires 15 to 20. In the cover *b* openings *f* are formed, one for each of the recesses *b*. These are preferably made somewhat larger than the diameter of the recesses *d*; or, if required, these may be made of the same diameter, which will cause them to hold the pins *e* more steadily in place. The pins *e* will be metallic or conductive material in such part of them as is required to form a connection between the wires, while their outer ends, extending beyond the cover *b*, will be of any suitable insulating material. A very suitable way of forming these pins would be to form them of wood, with a brass ferrule on their inner ends.

In the above description we have mentioned wires, but instead of wires strips or straps of metal *g* may be used, as illustrated in Fig. 12, where the strips or straps *g* are represented as set on edge; but they may also be set flat or horizontally, as shown in Figs. 13 and 14, and where they intersect (although at a distance from each other) holes *h* may be formed in them, as shown in Fig. 13, and a pin, *e*, inserted in the holes, as shown in Fig. 14, in which case the recesses *d*, Fig. 8, and Nos. 27 to 90, Fig. 2, may or may not be formed in the plate *a*, as desired.

Instead of the round pins shown in Figs. 6, 7, and 14, and instead of the circular openings *f*, shown in the cover *b*, (see Fig. 1,) openings of the configuration shown at *i*, Fig. 9, may be formed in the cover *b*, having one side parallel to each wire and the two other sides diagonal thereunto. The connection used in this case consists of a strip of metal, *k*, having its ends formed so that one end will rest fairly against the wire 15 and the other against the wire 6, or other wires, as the case may be. Between the ends an insulating-block, *l*, is secured, and on the top an insulating-cap, *m*, is attached. This cap is somewhat larger than the openings *i*, and thereby it governs the distance that the connection can be pushed into the cover *b*, against or upon which it rests.

It will be observed that one end of the fork or strip of metal *k* is longer than the other. This is on account of the distance between the generator and circuit connections. The advantage of this method of forming the connections between the wires or strips *g* is that if strips *g* be used with this modification of connector they form surfaces of connection. If wires are used with them they form lines of connection; but if the pins *e* are used with the wires they give very little better than points of connection.

Although, as above mentioned, I have described and shown in Figs. 6, 7, 10, 11, 13, and 14 three different modifications of means of connection between the wires or strips *g*, I wish to state that I do not confine myself to these three several modes of forming the said connections, as many other ordinary contrivances may be used for the same purpose.

As shown in Fig. 5, the plate *a* and cover *b* are situated at a greater distance apart than in Fig. 3, and the binding-posts 7 to 12 and 21 to 26 are correspondingly elongated. This is to give room for an insulating-diaphragm, *n*, to be situated between the two planes of wires above mentioned, thus cutting off the influence, as required, more particularly when heavy currents of electricity are used; also, insulating-strips *o*, as shown in Fig. 12, may be placed between the strips *g* or wires, as the case may be. These extend from the plate *a* to the diaphragm *n*, and similar strips may be placed between the cover *b* and diaphragm *n*, separating the wires or strips in the other plane, these strips *o* not only serving for insulating, but also to keep the wires or strips or straps *g* in place, openings being formed for the passage of the pins *e* or forks *k* to pass through. The extent of the diaphragm *n* is indicated by the dotted lines *n' n'* in Fig. 2.

The operation of my invention is as follows: In the first place, we will take the case of the use of my invention in connection with generators and circuits requiring to have positive and negative connections and circuits having similar connections, as used in electric lighting. As before stated, wires 1, 3, and 5 are the negatives, and 2, 4, and 6 the positive connections with three separate electric generators; and wires 15, 17, and 19 are the negative and 16, 18, and 20 the positive wires of three separate electric circuits. Now, we will suppose that it is desired to connect the generators acting upon wires 5 and 6 to the circuit represented by the wires 15 and 16. To do this, insert pins *e* in holes 42 and 28. By removing these pins and placing them in the holes 40 and 30, the same generator will be connected with the circuit represented by the wires 17 and 18; and by again removing the pins *e* and placing them in holes 38 and 32, the same generator will be connected to the circuit represented by wires 19 and 20. Similarly, the generator actuating the wires 3 and 4 can be connected by placing pins in the holes 58 and 44, or 56 and 46, or 54 and 48. The generator connected with wires 1 and 2 can be connected with any of the circuits by placing pins in the holes 74 and 60, or 72 and 62, or 70 and 64; and from the above it will be understood by any person of ordinary skill how each electric generator can be separately connected with each electric circuit.

I will now describe how three generators in series can be connected with one electric circuit. In this case the auxiliary wires 13, 14, 91, and 92 are brought partly into operation. Pins *e* are placed in the holes 28, 35, 50, 52, 62, and 74. The electric current starting from the positive wire 6 is transmitted to the circuit-wire 16, and passing through the circuit is returned through the wire 15, and by the pin in the hole 74 is connected with the negative wire 1, and passes to the generator operating the wires 1 and 2. The current passing along the positive wire 2 is connected with auxiliary wire 92 by a pin, e, placed in the hole 65. By a pin placed in the hole 52 this said auxiliary wire is connected with the negative wire 3 of the second electric generator operating the wires 3 and 4. Through this generator the electric current passes, and being returned by the positive wire 4, the current is connected with the auxiliary wire 91 by placing a pin, e, in the hole 50. The auxiliary wire is connected with the negative wire 5 by placing a pin, e, in the hole 35. Thus all the generators are connected with the circuit represented by wires 15 and 16.

In substantially the same manner all the generators may be connected with the two remaining circuits or any other, supposing the apparatus is constructed for a greater number than three circuits; also, a greater number of generators than three may be similarly connected. It must be remembered that if a greater number of circuits or generators are used, a corresponding increase in the number of auxiliary wires will be necessary; for if five generators and five circuits be arranged in the apparatus, four auxiliary wires will be required on each side instead of two, as shown in Fig. 2.

I will now describe how one generator may be arranged to operate the three circuits.

We will suppose that the generator operating the wires 5 and 6 is to be coupled in series with all the circuits. For this purpose pins e are placed in the holes 28, 75, 88, 78, 85, and 38. Thus the current is transmitted from wire 6 to wire 16, goes through the circuit and returns by wire 15; thence passes to wire 14, and from that passes to wire 18, goes through the second circuit and returns by wire 17, which is connected to wire 13, from which it passes through wire 20 and goes through the circuit and returns by wire 19, from which it passes to wire 5 and completes the series.

From the above it will be understood how one, two, three, or more generators may be arranged to operate in series upon any number of circuits.

I will now describe how one generator in multiple arc may be arranged to operate a number of circuits. This is done by placing pins e in the holes 42, 28, 40, 30, 38, and 32, which will cause the current to be divided and distributed along each circuit.

I will now describe how my invention will be employed when single connections are employed.

To couple the wires 15 and 6 together, a pin, e, is placed in hole 27, and similarly to connect any two wires together it is only necessary to put a pin into such hole, so that the two wires will be tangential to the pin.

This apparatus forms a very compact and efficient means of forming connections, such as those required for the telephone, telegraph, and electric lighting, and will transmit electric or other currents or undulatory motion from generators to circuits.

What I claim, and wish to secure by Letters Patent, is as follows:

The combination of the wires of electrical generators and auxiliary electrical generator-wires arranged in one plane with circuit wires and auxiliary circuit-wires arranged in another plane, the one said plane overlying the other, and the wires in the one said plane being in direction at an angle with the direction of the wires in the other said plane, and with connections arranged to connect one wire in one plane with another wire in another plane, the said connection consisting of a strip, k, formed into forked ends at an angle, the end of the fork with the other end of the fork, the said angle being made to agree with the angle of the wires in the two said planes, and the said fork having the block l placed between the forked ends, the whole substantially as described.

A. C. MATHER.

Witnesess:
CHARLES G. C. SIMPSON,
H. IRWIN.